United States Patent [19]

Nash

[11] Patent Number: 5,557,932
[45] Date of Patent: Sep. 24, 1996

[54] LOW THERMAL STRESS IMPINGEMENT COOLING APPARATUS

[75] Inventor: Dudley O. Nash, Cincinnati, Ohio

[73] Assignee: The United States of America as represented by the Secretary of the Air Force, Washington, D.C.

[21] Appl. No.: 874,207

[22] Filed: Jun. 6, 1986

[51] Int. Cl.6 ........................................ F02K 1/82
[52] U.S. Cl. ............................................. 60/266
[58] Field of Search ........................... 60/266, 265, 266, 60/267, 39.5; 239/127.1, 127.3, 128, 397.5; 244/117 A, 177 R; 415/178

[56] References Cited

U.S. PATENT DOCUMENTS

| | | | |
|---|---|---|---|
| 3,353,359 | 11/1967 | Webb | 60/265 |
| 3,848,697 | 11/1974 | Jannot et al. | 181/33 HB |
| 3,982,850 | 9/1976 | Jenkinson | 415/178 |
| 4,071,194 | 1/1978 | Eckert et al. | 239/127.3 |
| 4,081,137 | 3/1978 | Sutton et al. | 239/127.3 |
| 4,355,507 | 10/1982 | Coffey et al. | 60/39.5 |

*Primary Examiner*—Stephen C. Bentley
*Attorney, Agent, or Firm*—Gerald B. Hollins; Thomas L. Kundert

[57] ABSTRACT

An impingement cooling arrangement which avoids thermal cycling fatigue failures in the cooled member and cooling baffle member while retaining permanent rigid attachment of the cooling baffle member and cooled members at their periphery. The baffle includes an array of stress relieving smoothly curved in cross section furrows or grooves dispersed over the baffle surface and provides for intentional heat conduction to the furrow valley portions as a stress relieving mechanism. Heat conduction to the furrow valley portions is aided by the force of pressurized impingement cooling air at the baffle surface.

23 Claims, 2 Drawing Sheets

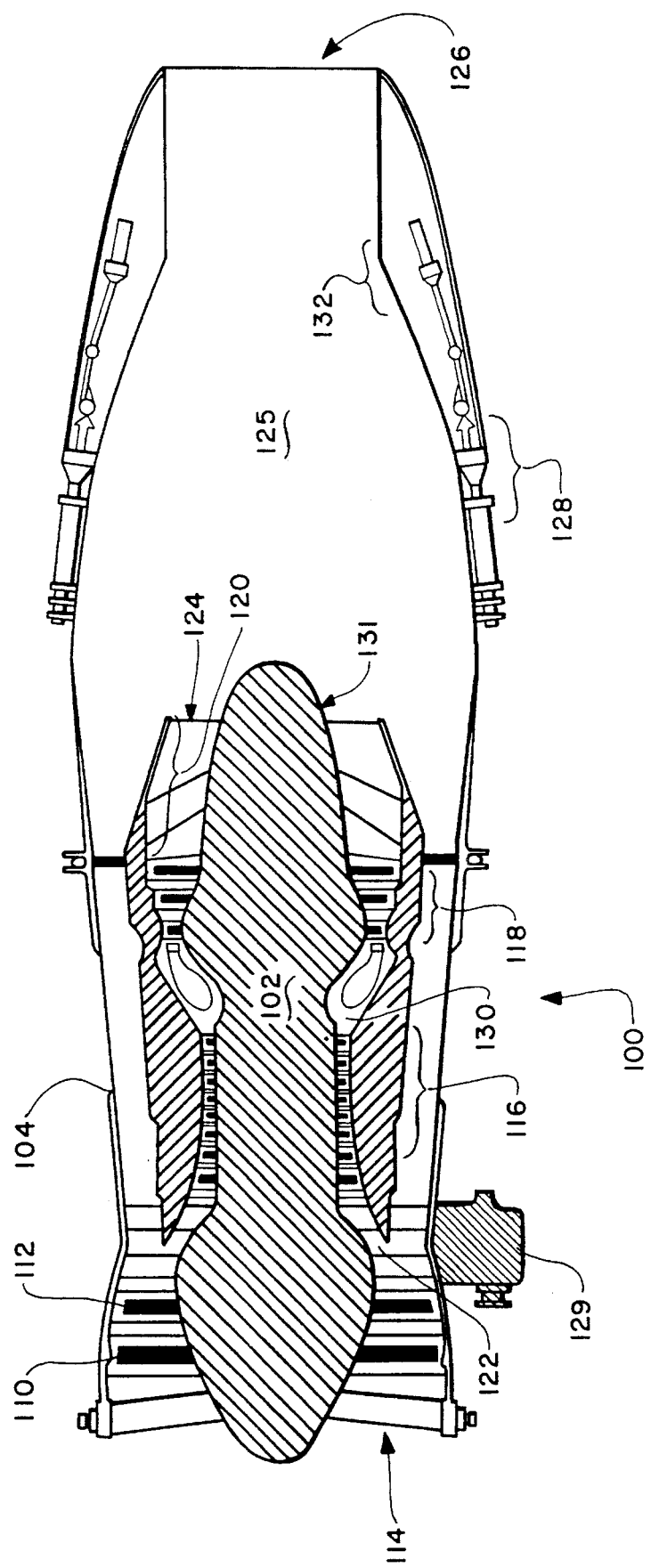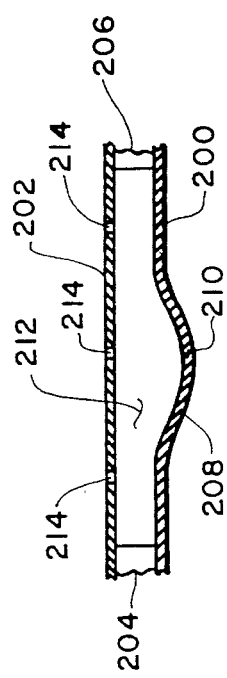
Fig. 1 PRIOR ART
Fig. 2 PRIOR ART

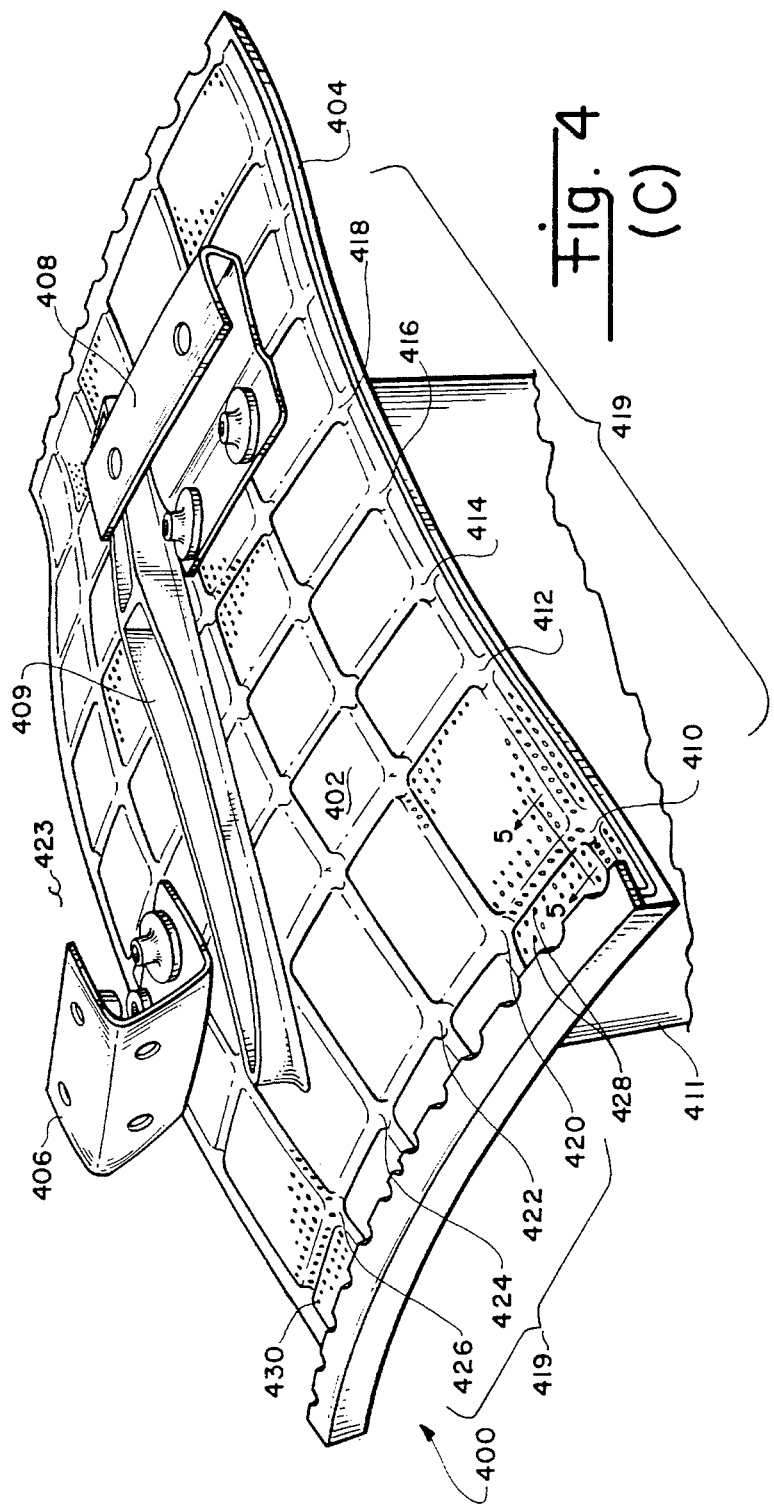
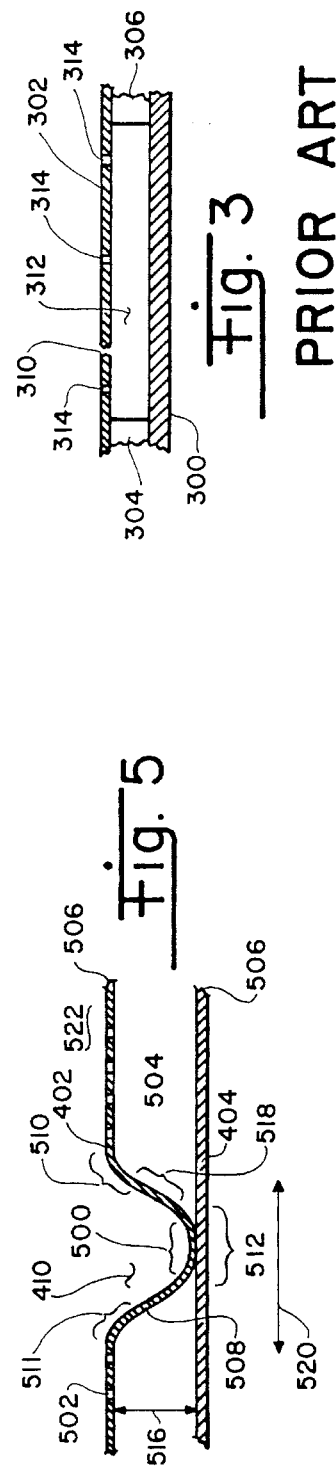

LOW THERMAL STRESS IMPINGEMENT COOLING APPARATUS

RIGHTS OF THE GOVERNMENT

The invention described herein may be manufactured and used by or for the Government of the United States for all governmental purposes without the payment of any royalty.

BACKGROUND OF THE INVENTION

This invention relates to the cooling of high temperature surfaces and particularly to the air jet impingement cooling of hot surfaces in a turbomachine aircraft engine.

The gas temperatures occurring in turbojet engines usually exceeds the temperature capabilities of the materials used for engine construction by a significant margin. The successful use of metals and other available materials in such engines therefore necessitates the precise cooling of elements in the hot section of the engine in order to avoid structural failures. Generally the cooling or temperature control of such elements is accomplished by a number of heat transfer arrangements including film and convection cooling—usually applied to both the heat exposed and heat source opposite sides of a heated member respectively.

An effective means for accomplishing convection cooling is found to reside in the technique of impingement cooling—an arrangement wherein a series of pressurized fluid jets are impinged on the reverse or heat source opposite side of the metal walls exposed to hot gas flow. Impingement cooling is therefore commonly used in the temperature control of hot surfaces in the rear portion of a turbojet engine. When impingement cooling is combined with film cooling that is located on the front or heat source side of these metal surfaces, a desirably effective total cooling arrangement is achieved. Such cooling is capable of accomplishing the needed control of metal temperatures, even with a relatively small flow of cooling fluid. The cooling fluid in such engines is usually air drawn from a cold section of the engine, such as from one of the compressor stages, for example. The relatively small flow of air needed in these cooling arrangements therefore offers a desirably small penalty on engine performance.

Heretofore the structural unity of an impingement cooling baffle and the element being cooled, has presented structural problems relating to thermal expansion and contraction of the involved materials between the temperature extremes encountered in engine operation. The close physical relationship of these two component elements in an engine and the widely varying temperature environment imposed frequently results in the occurrence of fatigue cracking and other forms of structural degradation which are undesirable in operating equipment such as aircraft.

The patent art includes several examples of cooling structures that are used in turbomachines such as aircraft engines and in other multiple layer heated environments. An example of these prior structures is found in the patent of Terry T. Eckert et al, U.S. Pat. No. 4,071,194, which concerns an arrangement for cooling the sidewalls of an exhaust nozzle using combined boundary layer or film cooling and impingement cooling. The Eckert et al invention is also concerned with thermal dimension changes occurring in high temperature structures and accommodates these dimension changes though the use of sliding mounts or slip joints which provide movement freedom in the lateral direction—as an accommodation response to thermally induced element dimension changes.

Other cooling arrangements for hot engine associated members is shown in the patent of Clayton G. Coffey et al, U.S. Pat. No. 4,355,507. The Coffey et al invention involves film cooling applied to a hot exhaust gas conducting conduit and seeks to maintain low temperatures in the cooled members in order to suppress the infrared emissions or infrared signature of the cooled object.

Another example of previous cooling arrangements is found in the patent of Joel F. Sutton et al, U.S. Pat. No. 4,081,137, which concerns the use of a corrugated structure for the rear nozzle portion of a jet engine. The Sutton et al apparatus employs an array of the corrugated elements to supply cooling air to the heated nozzle surfaces. The Sutton et al apparatus is also concerned with cooling air leakage and the maintenance of cooling in the presence of nozzle element movement.

Another example of aircraft engine cooling arrangements is found in the patent of Michel R. Jannot et al. U.S. Pat. No. 3,848,697, which also concerns the use of corrugated elements, elements that are disposed around the periphery of a turbojet engine rear portion in order to achieve acoustic damping of the engine exhaust stream and to provide cooling. Alternate corrugations of the Jannot et al structure are used for cooling air and engine exhaust containment. The Jannot et al invention involves the use of Helmholtz resonator principles in a variety of open-ended and closed-ended corrugation structures disposed surrounding a perforated exhaust gas enclosure. FIG. 8 of the Jannot et al patent also shows the use of a corrugation of increased height or amplitude as a separator between the hot engine liner and an external enclosing surface.

An example of controlled heat transfer using a quilted like or dimpled pattern in a metal foil insulating layer is found in the patent of John Jenkinson, U.S. Pat. No. 3,982,850. In the Jenkinson invention the heat transfer to an engine structural member and thereby the operating temperature and physical size of the structural member are controlled by covering the member with dimpled foil and by spacing the location of spot welds between the foil and the structural member at heat transfer determined intervals. Relative expansion movement between the dimpled foil and the structural member is contemplated in the Jenkinson invention notwithstanding the presence of the heat transfer spot welds. The use of a row and column organized dimple pattern is shown in FIG. 3 of the Jenkinson patent. Use of spot weld attachment disposed over the foil surface, concern with temperature tracking rather than element cooling, and the absence of teaching regarding thermal stress and fatigue effects are notable distinctions between the Jenkinson patent and the present invention.

While each of these prior patents contributes to the overall state of the engine element cooling art and to the structural arrangements used in engine cooling devices, none of these patents affords the cooling and structural advantages of the present invention apparatus, as will be understood from the following description.

SUMMARY OF THE INVENTION

The present invention provides an impingement cooling baffle surface arrangement that is useful in achieving the desired cooling of hot engine surfaces and is also of reduced thermal cycling fatigue effects. Such effects have previously led to appearance damaging and structural integrity threatening warping, buckling, cracking, and other impairments of the cooling baffle or cooled member by way of mechanisms that are addressed by the present invention. The invention also provides for efficient deployment of high-cost pressurized cooling fluid and thereby contributes to increased operating efficiency and lower fuel consumption when used in an engine apparatus. The surface of the impingement cooling baffle of the invention is disposed in a low stress configuration and additionally protected from stressing by thermal unity with the cooled member. The cooling arrangement of the invention can, of course, be used with apparatus other than a turbojet engine—use in furnaces, muffler devices, and hot gas conduits, for example, can be readily arranged.

An object of the invention is to therefore provide an impingement cooling baffle arrangement which is immune to the structural weakening effects of thermal expansion and contraction.

Another object of the invention is to provide a large area impingement cooling baffle which avoids the loss of high-pressure cooling fluid to leakages in the impingement cooling structure.

Another object of the invention is to provide a large surface impingement cooling baffle that is low in cost.

Another object of the invention is to provide an impingement cooling baffle that is readily adapted to a large number of heated member configurations.

Another object of the invention is to provide an impingement cooling baffle support arrangement which serves a multiple function in the operation of the apparatus.

Another object of the invention is to provide an impingement cooling baffle arrangement in which the pressurized cooling fluid accomplishes a plurality of functions.

Another object of the invention is to provide an impingement cooling arrangement which lends readily to being combined with film cooling arrangements.

Additional objects and features of the invention will be understood from the following description and the accompanying drawings.

These and other objects of the invention are achieved by separation maintaining support apparatus for an impingement cooling baffle segment and the adjacent cooled panel segment of a jet aircraft engine that includes means for rigidly connecting the impingement cooling baffle segment and the engine panel segment at peripheral regions of the segments, a matrix of V-groove deformations in the surface of the cooling baffle segment, the deformations being of separation distance height and extending between said segments; means urging the cooling baffle segment and said engine panel segment into pressured contact at the V-groove deformations.

BRIEF DESCRIPTION OF THE DRAWINGS

FIG. 1 shows a fan jet aircraft engine wherein apparatus according to the present invention may be utilized.

FIG. 2 is a representative cross-section of a heated element and impingement cooling baffle element sandwich usable in the FIG. 1 engine and showing a frequent failure mode of such structures.

FIG. 3 is another representative cross-section of a heated element and impingement cooling baffle sandwich also showing a second frequent mode of failure.

FIG. 4 is a perspective view of a structural element and impingement cooling baffle sandwich made in accordance with the invention.

FIG. 5 shows a representative cross-section of the FIG. 4 structure.

DETAILED DESCRIPTION

In FIG. 1 of the drawings there is shown a cross-sectional view of a heat operated turbomachine of the ducted turbofan engine type, an engine commonly used in commercial and military aircraft. The engine assembly 100 in FIG. 1 includes a core engine of the jet type 102, an overall housing 104, and a pair of bladed fans 110 and 112, which are driven by the core engine 102 by way of a central shaft which is not shown in FIG. 1. The core engine 102 includes a plurality of compressor stages 116, combustion chambers 130, and a plurality of hot gas driven turbine fans 118. The FIG. 1 engine assembly also includes a fuel supply and control package—which is indicated generally at 129, an after burner and exhaust port diameter controlling apparatus—which is generally indicated at 128 in FIG. 1, an inlet port 114, and an exhaust port 126.

During operation of the FIG. 1 engine assembly 100, a portion of the air captured by the inlet port 114 is received in the core engine inlet 122 and successively raised in pressure and reduced in volume by the core engine compressor stages 116, mixed with fuel and heated by fuel combustion in the chambers 130. The heated mixture of air and combustion products passes through the turbine stages 118 and the core engine rear aperture 124 into the plenum 125 for subsequent exhausting along with bypass air from the fans 110 and 112 through the exhaust port 126. The portion of the inlet air received through the inlet port 114, but not captured by the core engine inlet 122, bypasses around the core engine 102 in an annular space which surrounds the core engine. The mixture of bypass air flowing in the annular space around the core engine and the core engine combustion products produces thrust which is used in powering the aircraft in passing from the exhaust port 126 at high velocity. Other turbomachine arrangements can be used for stationary power generation, as air moving apparatus and for additional uses known in the art.

In the regions 118 and 120 of the core engine 102 and in the combustion chambers 130, gas temperatures which exceed the capabilities of the metals used for engine fabrication are to be expected. In each of these regions, and indeed, in most portions of the FIG. 1 engine, rearward of the compressor stages 116, some form of high temperature accommodation is therefore required. Usually this accommodation is provided in the form of continuous and carefully predetermined air cooling of the metal surfaces—in order that their operating temperatures be maintained sufficiently low as to maintain needed structural integrity.

In the regions 120 of the core engine, therefore, a combination of film and impingement cooling is often found desirable. Engine elements located in this region are continuously exposed to high temperature combustion gases and therefore frequently operate in the temperature range of 1600° K. for long periods of time even with cooling. A notable example of the difficulties which may arise in the design of engine elements for the region 120 is shown in a photograph appearing on the front cover of the McGraw Hill Company published technical journal *Aviation Week for the week of Mar. 26, 1984*. This photograph shows the region 132 of an operating and hot jet engine which operates at temperatures similar to region 120 and includes a view of the engine liner portion wherein there is located a pronounced pattern of heat induced metal surface warping and buckling.

Since such warping and buckling is usually responsive in severity or degree to engine operating temperatures, each engine startup and indeed, each change of engine operating conditions during an engine run results in a change of the warp and buckle intensity. Metal fatigue and other failure mechanisms are therefore to be expected in engine elements of this type with such warping and buckling or even less pronounced dimensional change.

Two failure conditions frequently encountered in double layered sandwich, impingement cooled structures from the region 120 of a jet engine are shown in FIGS. 2 and 3 of the drawings. The FIGS. 2 and 3 failure representations are of course, applicable to either the single flow type of jet engine or to the fan type of engine as shown in FIG. 1, as are other of the concepts heretofore described in connection with FIG. 1.

In FIG. 2 a portion of an engine liner plate as might be employed in the region 120 of the FIG. 1 engine is shown at 200. The engine liner plate portion 200 is separated from an attached impingement cooling baffle member 202 by a pair of standoff separators 204 and 206 to provide a clearance space 212 in which pressurized fluid from the impingement cooling apertures 214 travels to reach the rear side or heat source opposite side of the engine liner plate 200.

When the impingement cooling baffle 202 and the engine liner plate portion 200 are each rigidly connected to the standoff separators 204 and 206 in FIG. 2, in the manner which is preferred for preventing impingement cooling fluid leakage, the thermally induced expansion of the engine liner plate portion 200 can result in the formation of a buckle or blister 208. This buckle or blister is, of course, induced by plate expansion that is not accompanied by a corresponding expansion of the cooler operating impingement baffle member.

One of the disadvantages of an engine arrangement which allows formation of the buckle or blister 208 is that such buckle or blister deformations, once formed, tend to remain in existence and location and vary in intensity or depth in response to subsequent changes of engine operating temperature. During cooling of the hot liner plate, therefore, a formed buckle or blister 208 tends to reduce in size with the shrinkage of the hot liner plate, and to later reappear and intensify at the same location upon re-use or re-heating of the engine. Over a period of numerous hot and cold cycles, the crack 210 is thereby induced in the liner plate 200. A crack of this type is often characterized as a fatigue stress failure, and depending upon its location and propagation extent, may or may not represent a serious threat to the structural integrity of an engine.

The FIG. 2 illustrated buckle and crack failure mechanism frequently occurs in engine elements wherein the relative strength of the engine liner plate 200 and the impingement cooling baffle member 202 are of the same or similar value—in compression and tension, respectively, or where the cooling baffle member 202 is of greater strength than is the liner plate member 200. In contrast with the FIG. 2 conditions is the arrangement shown in FIG. 3 wherein the liner plate 300 is of greater strength than is the impingement cooling baffle member 302. In the FIG. 3 arrangement, expansion of the heavier, stronger liner plate 300 can be expected to induce such tensile forces in the impingement cooling baffle 302 as to induce and propagate a fracture or rupture 310 in the surface of the cooling baffle member. The other elements shown in FIG. 3 are similar to the correspondingly numbered elements in FIG. 2, including the standoff separators 304 and 306, the clearance space 312, and the impingement cooling apertures 314.

One of the FIG. 2 or FIG. 3 illustrated failure events or other undesirable conditions may therefore be expected in many of the previously arranged impingement cooling baffle and structural member combinations used in the region 120 or other stressed portions of an engine. At the least, such failure conditions present a cause for user concern; often such conditions are of more serious and even engine-threatening nature. The above-identified patent of T. T. Eckert, U.S. Pat. No. 4,071,194, recognizes some of these problems and suggests a possible solution.

FIGS. 4 and 5 of the drawings, however, shows a more practical and improved arrangement of an impingement cooling baffle and heated element, such as an engine liner plate. The FIG. 4 and 5 arrangement is capable of avoiding the failure modes illustrated in FIGS. 2 and 3 of the drawings, and therefore of providing long thermal cycle and operating time lifes in engine structures. In FIG. 4, a heated element in the form of an engine panel segment is shown as an assembly and identified by the number 400. The assembly 400 is comprised of an engine panel segment 404, an impingement cooling baffle 402, and typical panel mounting brackets 406 and 408. Not shown in FIGS. 4 and 5 is the escape path for spent impingement cooling air which may be via a series of film cooling apertures disposed in the lowermost or heated surface of the panel segment 404. The duct 409 in FIG. 4 serves an additional function in an engine embodiment, gas deflecting vane action.

A series of furrows, or corrugations, or vee-shaped grooves, is shown incorporated in the cooling baffle 402 in FIG. 4, these furrows are shown to extend laterally in a two-dimensional grid or array across the surface of the impingement cooling baffle 402. Several of the engine circumferentially oriented furrows in this array are indicated at 410, 412, 414, 416, and 418 in FIG. 4, while several of the engine axial oriented furrows are indicated at 420, 422, 424, and 426 in FIG. 4. A cross-sectional view of the furrow 410 is shown in FIG. 5 of the drawings, a view taken along the cutting line 5—5 in FIG. 4. Several of the FIG. 4 identified elements are also shown in FIG. 5, together with certain additional elements and dimensions as are described subsequently herein.

The furrows or corrugations or V-grooves, which are hereinafter called furrows, shown disposed in the impingement cooling baffle 402 in FIG. 4, function to prevent the occurrence of FIG. 2 and FIG. 3 illustrated failure events through an interesting combination of characteristics which have heretofore been overlooked in the arrangement of double layered structures such as an impingement cooled member and its attending cooling baffle.

Before describing these interesting attributes of the furrows 410, 412, 416, 418 and 420, 422, 424, 426 in FIG. 4, it is significant to note that the most desirable arrangement of an impingement cooling baffle on its adjacent cooled panel member calls for rigid attachment of the baffle and cooled panel members at their periphery—at the circumference of the FIG. 4 illustrated assembly. This rigid and integral attachment of the cooling baffle precludes spurious and unpredictable loss of pressurized cooling air from the assembly 400 as might be expected from the slip joint expansion arrangement shown in the above mentioned patent of T. T. Eckert et al, and from other conceivable arrangements for the periphery of engine panel segments of the type shown in FIG. 4. Preferably, this rigid attachment is accomplished by means of brazing, welding, or other permanent joinings as are known in the metal working art. By way of this rigid attachment, therefore, the FIG. 4 structure is made susceptible to failures of the type shown in FIGS. 2 and 3—except for presence of the array of furrows in the FIG. 4 cooling baffle.

The array of furrows 410, 412, 414, 416, 418, 420, 422, 424, and 426 is hereinafter collectively referred to as the furrow array 419 and is typically represented by the furrow 410. As can be more fully appreciated from the FIG. 5 view of the furrow 410, the separation distance between the impingement cooling baffle 402 and the panel segment 404, the separation distance 516 in FIG. 5 is maintained over the surface of the panel segment 404 by the periodic occurrence of furrows in the array 419. Maintenance of a predetermined separation distance between the cooling baffle 402 and the rearward or heat source opposite side of the panel segment 404 is, of course, desirable to achieve the optimum impingement cooling effect and to provide an escape plenum, an isolated plenum for the spent impingement cooling air, as is known in the impingement cooling art. Maintenance of the separation distance 516 and formation of the airflow plenum 504 in FIG. 5 are therefore two of the desirable functions performed by the furrows in the array 419.

An additional aspect of the furrows in the array 419 concerns the accommodation of lateral dimensional changes in the panel segment 404 by the cooling baffle 402, that is, prevention of the failure modes described in FIGS. 2 and 3 herein within the assembly 400. The use of rounded corner cross-sectional shapes, shapes of the type identified at 500, 510, and 511 in FIG. 5, in order to accommodate panel 404 dimensional changes in the direction indicated by the arrow 520 in FIG. 5 can, of course, be understood to be feasible. The furrow array 419 allows dimensional changes in the arrow indicated direction to be accommodated by gentle, low stress-inducing changes in the sloping side and corner shape of the V-groove 410 to accomplish this accommodation. The use of gently rounded cross-sectional shapes as a corner-stress relieving concept in fabricated structures is of course, the basis for the filleted cross-sections frequently used in machine design and in other vibration subjected structures. Both the additional length of the path traversing the furrow 410 and the gently rounded corner shapes of the furrow 410 are therefore useful in limiting the temperature change incurred stresses in the cooling baffle 402 and the panel segment 404 in FIGS. 4 and 5 of the drawings.

A further aspect of the furrows in the array 419 may be appreciated by hypothetically considering the prospect of arranging the FIGS. 4 and 5 structure in a manner which calls for the furrow 410 to be inverted in nature—to thereby form the array 419 in the form of crests or waves rather than the furrows heretofore indicated. Experience shows that such an inverted furrow arrangement of the FIGS. 4 and 5 structure is not nearly so effective as the illustrated arrangement in prevengint the occurrence of thermal cycle failure events of the type shown in FIG. 2, for example. An appreciation of this significant performance difference involves inter alia consideration of conditions attending the material located in the valley of the furrow 410, the material indicated by the bracket 500 in FIG. 5, and a comparison consideration of the similar material which would comprise the corresponding peak regions in the hypothetical array of crests.

While most surface of cooling baffle 402 readily changes length and width in response to the thermally-induced expansion and contraction of panel 404 by way of flexing of the furrow material, the material 500 in the valleys of the furrows, considered along the length of the furrows, requires other means of accommodating the expansion and contraction of panel 404. It will be noted that this material in the furrow valleys taken over the overall length or width of baffle 404 forms a straight, unfurrowed line which, in the absence of flexing action in the furrows or crests, would be subjected to high thermal stress and cracking. Indeed, the material located in the furrow valleys or at the crest ridges in the hypothetical arrangement has little protection from the incidence of large forces and large stresses as a result of length changes occurring in the valley, or crest located material.

Protection of this valley or crest material from high stresses and from thermal cycling fatigue failure is, however, found to reside in the arrangement shown in FIG. 5. In this arrangement the valley material, the material identified by the bracket 500 in FIG. 5, is held in close thermal compliance with the temperature of the engine panel segment 404. The region of this close thermal compliance at the furrow exterior to engine panel interface is identified by the number 512 in FIG. 5. The thermal compliance resulting from conduction heat transfer between the panel and valley materials causes the temperature of the valley material 500 to increase along with the panel temperature and thereby avoid severe thermal stress which would otherwise exist.

The intentional temperature compliance or heating of valley residing material in the furrows of the array 419 is therefore believed to afford thermal cycling stress relief in accordance with a plurality of mechanisms. One of these mechanisms involves the concept that portions of the cooling baffle member may, if they are not closely associated thermally with the engine panel segment, actually undergo more severe thermal stress cycles during engine operation than does the engine panel member material itself. It is notable that the hypothetical array of crests embodiment of FIG. 5 avoids thermal compliance expressly—and conceivably thereby becomes susceptible to more severe stress levels as a result of normal operational thermal cycling—a result consistent with the undesirable performance of such baffle arrangements.

Another mechanism operative in the beneficial effects of heating the furrow valley material attends the inherent shifting of the region of temperature transition between the hot engine panel temperatures and the cool baffle surface temperatures into the gently sloping side wall regions of the furrows, the regions indicated by the bracket 518 in FIG. 5 as a result of temperature compliance heating of the valley material. It is also plausible, of course, that the generous amount of baffle material available in the side wall portions of the furrow cross-section is capable of accommodating dimensional change in the direction perpendicular of the FIG. 5 drawing plane without the incurrence of large material stresses.

It is of course, also possible that mechanisms or theories in addition to, or other than, those recited here may be operative in the success achieved with the described baffle array of furrows arrangement. Such other mechanisms or theories may become apparent to those skilled in the related arts, but are believed secondary considerations with respect to successful practice of the invention.

The maintenance of bearing contact between the furrow exterior portion and the engine panel surface at the interface 512 is therefore a desirable operating parameter of the FIG. 4 apparatus. The achievement of this bearing, thermally conductive, contact is materially assisted in the FIG. 4 apparatus by the presence of the pressurized impingement cooling fluid or air in the space above the baffle 402, the space indicated by the number 423 in FIG. 5. For effective impingement cooling the relative areas of the impingement cooling flow apertures, indicated typically at 428 and 430 in FIG. 4, in relation to the area of the apertures allowing escape of the spent impingement cooling fluid from the plenum 504 are sized so that an air pressure originated force acts in a downward direction on the baffle 402 in FIGS. 4 and 5. It is therefore an additional aspect of the invention that this air pressure force urges the baffle furrow exterior portion into intimate thermal contact with the heated panel member 506 in the regions of interface 512 that occur over the entire FIG. 4 surface. This air pressure actuated force at the interfaces 512 may, of course, be supplemented with spring forces residing in the baffle 402 or with other supplemental forces, if desired; such supplementing is believed unnecessary to satisfactory operation of the FIGS. 4 and 5 apparatus, however—especially if the pressure and volume of the air supplied to the space 423 is also considered with respect to the area of the air flow apertures 428, 430 and the spent air apertures.

The rectilinear orientation shown in FIG. 4 for the furrow array 419 is desirable for use with panel members and other structural components having a generally rectangular outline shape, and is also convenient for use with panels of the curving cross-sectional shape shown in FIG. 4. The resulting rectangular or substantially rectangular pillow-like patterns afforded in the baffle structure are found to desirably accommodate the thermally induced expansion and contraction of the panel and baffle members. It should be realized, however, that in the case of a curved or circular engine part or in other design situations it may be desirable to employ curving trajectories for the furrow array used in a particular impingement baffle. Circular, ellipsoid, oval, spiral, and other geometric furrow patterns lengthwise dispositions are, of course, within contemplation of the invention. Such alternate furrow dispositions might for example, be advantageously employed in a more complex shape, such as in the duct 411 in FIG. 4. Similarly, the spacing shown between adjacent of the furrows in the array 419 may be altered to suit individual design requirements and may consider inter alia operating temperatures, thermal coefficients of expansion, desired baffle to panel member spacings, and other design parameters.

Additional details of the FIG. 4 apparatus shown in FIG. 5 include the impingement cooling aperture nozzles 502 and 508, which along with the apertures shown at 428 and 430 in FIG. 4, comprise representative portions of the apertures spread throughout the baffle 402. The impingement cooling apertures are preferably located according to a predetermined pattern which considers the available impingement cooling air pressure, the heat load imposed on the panel segment 404, and other design considerations. The aperture 508 is shown to be located in the side walls of a furrow member, such locations may be less effective for cooling purposes or for spent cooling air escape from the plenum 504, but are a matter of design preference. The cooling dispensed by the impingement cooling aperture nozzles is desirably obtained from the compressor stages of the engine which carries the cooled panel segment, i.e., from the stages 116 in the FIG. 1 engine. Conservation or minimal use of this cooling air is desirable in order to minimally penalize compressor and engine thermodynamic efficiencies. The cutoff symbols 506 in FIG. 5, of course, indicate the continuing nature of the cooling baffle surface in accordance with normal drawing practice.

The furrow members of the array 419 in FIG. 4 therefore represent a multiple featured addition to the structure of a heated panel segment and its associated impingement cooling baffle. Among the desirable aspects of these furrows are the maintenance of desired clearance between the baffle and panel members, the provision of stress decreasing extra flexure capable, material surface length between attachment points of the baffle member and the panel member, the complete segregation of impingement cooling plenums, the provision of stress minimizing rounded cross-sectional corners for thermal dimension change accommodation, the increase of thermal dimension change in the furrow valley portions, and shifting of the dimension change region upward into the furrow side walls through intentional heating of the furrow valleys—to achieve improved thermal cycle fatigue life, and the use of cooling air pressure to maintain heat transferring pressured contact between the furrow valleys and the heated panel segment.

Alternate arrangements and alternate uses of the invention are of course possible. For example, rounded corner shapes other than the preferred vee groove are feasible for the furrows—particularly reentrant shapes such as that of an inverted Greek letter omega $\Omega$ or shapes comprised of sinusoidal waveform portions. Use of the invention is, of course, not limited to aircraft engines. Similarly, the employment of pressurized air as a cooling fluid is but one possible arrangement of the invention and other fluids both gaseous and liquid may be desirable in other embodiments of the invention.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. Limited thermal stress fracture-resistant impingement cooling apparatus for distributing cooling fluid over a heated member comprising:

a cooling baffle member disposed substantially parallel of said heated member on the heat source opposite side thereof and at predetermined separation distance therefrom, said cooling baffle member having adjacent first and remote second sides with respect to said heated member;

means for rigidly joining said cooling baffle member to said heated member at lateral peripheral portions thereof;

a pattern of furrow depressions interrupting the lateral extent of said cooling baffle member surface central of said rigidly joined peripheral portions, said furrow depressions at the adjacent side apex portion thereof contacting said heated member and supporting the said baffle and heated members in said predetermined separation;

an array of impingement cooling fluid transmission apertures disposed in a predetermined pattern over the surface of said cooling baffle member; and a source of pressurized cooling fluid communicating with said cooling baffle member remote side.

2. The apparatus of claim 1 wherein said separation distance is predetermined in response to optimum impingement cooling at said heated member heat source opposite side.

3. The apparatus of claim 1 wherein said furrow depressions include lengthwise extending portions of curved lateral disposition.

4. The apparatus of claim 3 wherein said curved furrow depressions comprise a spiral pattern.

5. The apparatus of claim 1 wherein said furrow depressions are of straight line lateral extent across the surface of said cooling baffle member.

6. The apparatus of claim 5 further including a grid array of intersecting said furrow depressions.

7. The apparatus of claim 6 wherein said grid array of furrow depressions includes orthogonally disposed column and row organized furrows.

8. The apparatus of claim 7 further including film cooling means having film cooling apertures disposed across the lateral extent of said heating member for communicating spent said impingement cooling fluid transverse of said heated member cross-section to said heat source side thereof.

9. The apparatus of claim 7 wherein said film cooling apertures are angularly disposed with respect to said cooling baffle.

10. The apparatus of claim 1 further including means for urging said furrow depression adjacent side apex portion and said heated member heat source opposite side into heat conducting bearing contact;

whereby the temperature of said heated member and said cooling baffle member adjacent side apex portion are maintained in tracking relationship and thermally induced dimensional cycling in said cooling baffle member is confined to side portions of said furrow depressions intermediate the cool temperatures at said cooling baffle member separation distance portion and the hotter temperatures at said furrow depression apex portion and the thermal cycling stress at said depression apex portion is minimized.

11. The apparatus of claim 10 wherein said means for urging includes cooling fluid pressure differential between said member first and second sides.

12. The apparatus of claim 11 wherein said means for urging includes selected relative size and volume dimensions in said cooling fluid transmission aperture area and said pressurized cooling fluid flow.

13. The apparatus of claim 1 wherein said heated member is a portion of a jet aircraft engine.

14. The apparatus of claim 13 wherein said heated member comprises a three-dimensionally curved panel segment of the engine housing of said jet engine.

15. The apparatus of claim 1 wherein said source of pressurized fluid includes the compressor stage of said jet engine.

16. The apparatus of claim 1 wherein said furrow depressions are of smoothly rounded cross-sectional curvature in regions of depression cross-section directional change.

17. A method for operating the impingement cooling baffle element and adjacent high temperature engine housing element in an aircraft jet engine to reduce thermal stress cracking in said elements, comprising the steps of:

imposing the thermal expansion and contraction lateral dimension changes of said high temperature housing element on the lateral periphery of said engine cooling baffle element;

limiting the tensile and compressive forces induced in said baffle element with said imposed dimension changes by interrupting the lateral extent of said baffle element with an array of grooves disposed in two dimensions across the baffle element surface, said grooves including valley and sloping side, cross sectional portions;

shifting the region of thermal stressing in said baffle element grooves away from the groove valley portion by conducting heat from the adjacent high temperature engine housing element into the groove valley portion; and urging the groove valley portion and high temperature housing element into heat conducting thermally intimate contact to improve and maintain said shifting of thermal stressing.

18. The method of claim 17 wherein said step of imposing the thermal expansion includes rigidly sealing said baffle element with said housing elements at peripheral portions thereof.

19. The method of claim 18 further including the step of increasing the heat conduction and decreasing the thermal stress susceptibility in said groove bottom portion by gently rounding the cross-sectional shape of the groove bottom portion.

20. The method of claim 19 wherein said urging step includes the application of resilient cooling fluid differential pressure to the surfaces of said baffle element.

21. Separation distance maintenance apparatus for an impingement cooling baffle segment and the adjacent cooled panel segment of a jet aircraft engine comprising:

means for rigidly connecting said impingement cooling baffle segment and said cooled engine panel segment at peripheral regions of said segments;

a matrix of V-groove deformations in the surface of said cooling baffle segment, said deformations being of separation distance height and extending between said segments;

means urging said cooling baffle segment and said engine panel segment into pressured contact at said V-groove deformations.

22. The apparatus of claim 21 wherein said means urging includes pressurized air from the compressor stage of said engine.

23. The apparatus of claim 21 wherein said V-groove deformations extend over the central portion of said cooling baffle segment and stop short of said rigid connection peripheral regions.

* * * * *